(12) United States Patent
Huckfeldt et al.

(10) Patent No.: US 6,385,743 B1
(45) Date of Patent: May 7, 2002

(54) METHOD OF SYNCHRONIZING AN ELECTRONIC DEVICE FOR MONITORING THE OPERATION OF A MICROPROCESSOR, AND AN ELECTRONIC DEVICE FOR CARRYING OUT THE METHOD

(75) Inventors: Olaf Huckfeldt, Hagen; Michael Lenz, Zorneding, both of (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 09/227,673

(22) Filed: Jan. 8, 1999

(30) Foreign Application Priority Data

Jan. 8, 1998 (DE) .......................... 198 00 462

(51) Int. Cl.⁷ .............................. G06F 11/30; G06F 9/52
(52) U.S. Cl. .......................................... 714/51; 709/400
(58) Field of Search .............................. 714/51, 55, 12, 714/9, 47, 815; 709/400; 713/323; 340/825.06

(56) References Cited

U.S. PATENT DOCUMENTS 4,956,842 A * 9/1990 Said
5,226,152 A * 7/1993 Klug et al.

FOREIGN PATENT DOCUMENTS

DE 43 29 872 A1 3/1995
EP 0 390 639 A1 10/1990

OTHER PUBLICATIONS

IBM Technical Disclosure Bulletin, vol. 41, No. 1, Jan. 1998, p. 737, Watchdog timer in Power–Management–System.

* cited by examiner

Primary Examiner—Gopal C. Ray
(74) Attorney, Agent, or Firm—Herbert L. Lerner; Laurence A. Greenberg; Werner H. Stemer

(57) ABSTRACT

The novel method synchronizes an electronic device for monitoring the operation of a microprocessor (watchdog) with the microprocessor when the microprocessor is run up from a quiescent mode to an operating mode. The synchronization is effected by a trigger signal that is transmitted from the microprocessor to the monitoring device and that signals the operational availability of the microprocessor. The monitoring device, in order to receive the trigger signals, temporally toggles between a CLOSED window status, in which a trigger signal cannot be detected by the monitoring device, and an OPEN window status, in which the received trigger signal brings about synchronization between the microprocessor and the monitoring device. The microprocessor watchdog device has a trigger signal input which toggles, in a clocked manner, between a disabled position (CLOSED window) and an enabled position (OPEN window). The trigger signal is received during the OPEN window.

9 Claims, 3 Drawing Sheets

METHOD OF SYNCHRONIZING AN ELECTRONIC DEVICE FOR MONITORING THE OPERATION OF A MICROPROCESSOR, AND AN ELECTRONIC DEVICE FOR CARRYING OUT THE METHOD

BACKGROUND OF THE INVENTION

FIELD OF THE INVENTION

The invention lies in the field of microprocessors. More specifically, the invention relates to a monitoring method for testing the operability of a microprocessor, particularly when the microprocessors are run up from a quiescent mode to an operating mode.

The invention relates, in particular, to a method of synchronizing an electronic device for monitoring the operation of a microprocessor (watchdog) with the microprocessor when the microprocessor is being run up from a quiescent mode to an operating mode, whereby the synchronization includes producing a trigger signal with the microprocessor, transmitting the trigger signal to the monitoring device, and indicating with the trigger signal the operational availability of the microprocessor;

the monitoring device, in order to receive the trigger signals, temporally toggles between a CLOSED window status, in which a trigger signal cannot be detected by the monitoring device, and an OPEN window status, in which the received trigger signal brings about synchronization between the microprocessor and the monitoring device.

The invention also relates to an electronic device for monitoring the operation of a microprocessor (watchdog), having a trigger signal input which toggles, in a clocked manner, between a disabled position (CLOSED window) and an enabled position (OPEN window). The trigger signal is received during the OPEN window in order to bring about synchronization between the microprocessor and the monitoring device.

As indicated in parentheses above, such monitoring devices are referred to as watchdogs. A particular refinement of such watchdogs is so-called window watchdogs which provide time windows that are spaced apart from one another and within which a trigger signal can be received signaling the operational availability of the microprocessor that has been run up, in order to bring about the desired synchronization between the microprocessor and the monitoring device. These time intervals are usually termed OPEN windows. The OPEN windows are separated from one another by so-called CLOSED windows in which trigger signal detection is not possible and the trigger signal input of the monitoring unit is thus disabled. Depending on the desired application, the time periods of the OPEN window and the CLOSED window may be the same or else different. The temporal change sequence of CLOSED window and OPEN window starts with a CLOSED window status.

Synchronization between the microprocessor and the monitoring device is brought about by virtue of the fact that, on achieving operational availability, the microprocessor produces a trigger signal which is applied to a corresponding trigger signal input of the monitoring device. If the monitoring device detects a trigger signal, the synchronization reset is carried out, in which, when the trigger signal is received, the monitoring device immediately closes the OPEN window status and starts toggle operation, starting with a CLOSED window. During this synchronization reset, the clock-signal generator continues to oscillate, so that the time period necessary for synchronization is very short.

With both the microprocessor and the monitoring device initially in a quiescent mode, a wake-up interrupt is produced in the microprocessor whenever there is a signal capable of initiating wake-up present at one of its inputs. The increase in current consumption of the microprocessor when it is running up activates the monitoring device, which adopts its toggle operation between the CLOSED window status and the OPEN window status, starting with a CLOSED window. At the instant at which toggle operation starts, the clock-signal generator of the microprocessor has not yet reached the steady state and is not stable, however. The microprocessor does not achieve operational availability until the clock-signal generator has reached the steady state and is stable. At that instant, the microprocessor produces the trigger signal. The instant is undefined within specific limits. Consequently, the trigger signal may fall in the first CLOSED window, so that this trigger signal does not bring about the desired synchronization reset. A synchronization reset is carried out only if the trigger signal happens to fall in the OPEN window adjoining the CLOSED window. From that instant on, the toggle operation of the monitoring device runs synchronously with the microprocessor.

If the trigger signal does not appear in an OPEN window, provision is made for a full reset of the microprocessor to be triggered at the end of the time period of the first CLOSED and OPEN windows. Although this reset ultimately also leads to synchronization between the microprocessor and the monitoring device, it means that the microprocessor is fully restarted. In the time required for this reset, the microprocessor cannot be used for performing the desired actions. Furthermore, data recorded in available storage elements may be deleted in the course of such a reset. Deleting the stored information is often undesirable, however, particularly when the stored data are position data for an actuator and position detection for the actuator operation is carried out on a relative basis.

Since, from a statistical point of view, there is a very high probability that the trigger signal produced by the microprocessor will fall in the first CLOSED window of toggle operation of the monitoring device, indirectly triggering a full reset of the microprocessor, and hence also renewed stabilization of the clock-signal generator, at the end of the OPEN window which follows this CLOSED window, not only is the current consumption for synchronization undesirably high, but the response time of the microprocessor is also too long.

Other monitoring devices are known, which have trigger signal inputs with a window sequence comprising nothing but OPEN windows. These monitoring devices do not have the problems described above. However, the monitoring function of a window watchdog is improved many times on account of the necessary synchronization described between the microprocessor and the monitoring device.

SUMMARY OF THE INVENTION

It is accordingly an object of the invention to provide a method of synchronizing a window watchdog with a microprocessor, which overcomes the above-mentioned disadvantages of the heretofore-known devices and methods of this general type and which enables both units to be synchronized without running the risk of fully resetting the microprocessor when it is operable. In addition, the invention is based on the object of providing a window watchdog with which synchronization with the microprocessor is correspondingly possible.

With the foregoing and other objects in view there is provided, in accordance with the invention, a method of synchronizing a microprocessor watchdog with a microprocessor when the microprocessor is run up from a quiescent mode to an operating mode, which comprises:

producing a trigger signal with a microprocessor indicating an operational availability of the microprocessor, and transmitting the trigger signal to a microprocessor watchdog;

temporally toggling the microprocessor watchdog between a CLOSED window status, during which the trigger signal cannot be detected by the monitoring device, and an OPEN window status, during which the received trigger signal brings about a synchronization between the microprocessor and the microprocessor watchdog; and upon having been activated, providing an OPEN window range over a predetermined time period with the monitoring device, whereby the time period is predetermined to detect the trigger signal produced by the microprocessor operating under normal conditions.

In other words, the invention is characterized by the process in which, after it has been activated, the monitoring device provides an OPEN window range over a predetermined time period, and the time period is designed to detect the trigger signal produced by the microprocessor operating in normal conditions.

In accordance with an added feature of the invention, at the end of the predetermined time period the microprocessor watchdog is toggled between a CLOSED window status and an OPEN window status, starting with a CLOSED window.

In accordance with an additional feature of the invention, the microprocessor includes a clock-signal generator having a maximum stabilization time, and the microprocessor watchdog provides a first OPEN window range with a time duration at least as long as the maximum stabilization time of the clock-signal generator.

In accordance with another feature of the invention, the microprocessor watchdog is activated before the microprocessor has achieved full operational availability.

With the above and other objects in view there is also provided, in accordance with the invention, an electronic device for monitoring the operation of a microprocessor, comprising:

a trigger signal input toggling, in a clocked manner, between a CLOSED window position and an OPEN window position, said trigger signal input receiving in the OPEN window position a trigger signal from a microprocessor bringing about a synchronization between the microprocessor and the electronic monitoring device;

the electronic monitoring device, upon being activated, first starting in the OPEN window position and maintaining the OPEN window position for a time duration sufficient to detect the trigger signal from the microprocessor operating under normal conditions, wherein the OPEN window position is followed by a window change sequence comprising CLOSED windows and OPEN windows, starting with a CLOSED window.

The system thus comprises a window watchdog whose toggle operation starts with an OPEN window range when it has been activated, whereby the OPEN window range in fact last long enough to receive the trigger signal from a normally operable microprocessor. This ensures that the monitoring device according to the invention has an OPEN window status, and is thus ready to receive, within the critical time period for receiving the trigger signal.

The arrival of the trigger signal then results in the synchronization reset, during which the clock-signal generator of the microprocessor continues to oscillate. Synchronization is brought about by virtue of the fact that, at this instant, the monitoring device immediately changes over to toggle operation between the CLOSED window status and the OPEN window status, starting with a CLOSED window. With this monitoring device, a full reset of the microprocessor, comprising the clock-signal generator starting to oscillate again, is carried out only if the microprocessor has not started to work properly after the predetermined time period and has accordingly not produced a trigger signal. However, this occurs at an instant which is chosen such that failure to receive a trigger signal suggests that the microprocessor is not working correctly. In such cases, the microprocessor can continue to operate only by being re-initialized.

With the monitoring device according to the invention, synchronization is, in the case of a normally operable microprocessor, always carried out without fully resetting the microprocessor. The current consumption necessary for carrying out synchronization is thus reduced to a minimum. Furthermore, synchronization between the microprocessor and the monitoring device is produced much more quickly than with previously known window watchdogs. The response time of the microprocessor is correspondingly short, so that the desired action is carried out immediately. The full reset trigger provided after the OPEN window range has closed if no trigger signal has been received thus serves exclusively as an emergency reset.

In accordance with again an added feature of the invention, the microprocessor has a clock-signal generator with a maximum stabilization time, and the first OPEN window position has a time duration whose length corresponds at least to maximum stabilization time of the clock-signal generator of the microprocessor, i.e. the OPEN window has a length that is no shorter than the maximum transient stabilization of the clock-signal generator associated with the microprocessor. In this case, the time interval between the maximum stabilization time of the clock-signal generator and the closing of the OPEN window range is equivalent to a safety time period.

In accordance with again an additional feature of the invention, the first OPEN window position has a time duration whose length is slightly longer than the maximum stabilization time of the clock-signal generator of the microprocessor.

In accordance with again a further feature of the invention, the first OPEN window position is formed of a plurality of individual OPEN windows.

In accordance with a concomitant feature of the invention, the first OPEN window position is formed of two individual OPEN windows. The two OPEN windows have total time period that corresponds to a CLOSED window—OPEN window interval in the subsequent toggle operation.

Other features which are considered as characteristic for the invention are set forth in the appended claims.

Although the invention is illustrated and described herein as embodied in a method of synchronizing an electronic device for monitoring the operation of a microprocessor, and an electronic device for carrying out the method, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
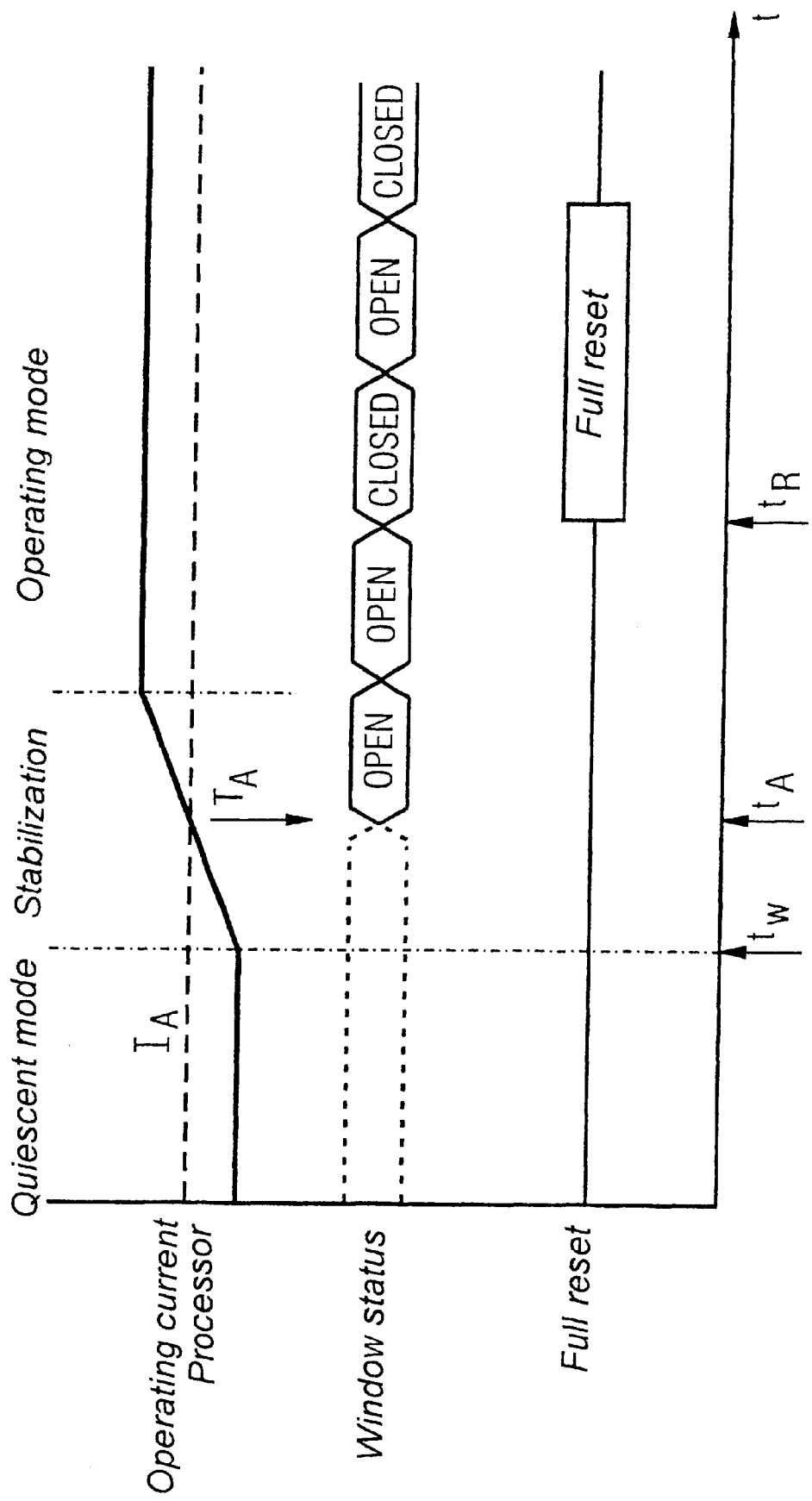
FIG. 1 is a diagrammatic timing chart showing the synchronization parameters which change over time and are required for synchronization between a microprocessor and a monitoring unit.

Referring now to the figures of the drawing in detail and first, particularly, to FIG. 1 thereof, there is seen a graph of various parameters which are of interest in connection with the description of the method and device according to the invention, whereby the parameters are plotted one above the other on the ordinate axis. The operating current curve of the microprocessor is drawn at the top. Below that is the window status of the monitoring device. The lowermost line indicates the instant of a full reset which restarts the microprocessor. The abscissa axis represents the time axis.

The time of the diagram section shown starts in a quiescent mode in which the microprocessor and the monitoring device are inactive. At an instant $t_W$, a wake-up signal is present at an input of the microprocessor, so that a wake-up interrupt is produced. The interrupt causes the clock-signal generator to start its transient recovery process. As the oscillation frequency increases, the operating current of the microprocessor rises. The monitoring device is activated when the operating current of the microprocessor exceeds a predetermined threshold value $I_A$. The start instant is marked by $t_A$ on the time axis t.

The trigger signal input of the monitoring device first provides two OPEN windows before changing to normal toggle operation between the CLOSED window status and the OPEN window status. In the event that the monitoring device has not received a trigger signal signaling the availability of the microprocessor within the time period of the two first OPEN windows, a full reset of the microprocessor is carried out, so that, if the microprocessor is operable after this reset, the microprocessor and the monitoring device are synchronized. That instant is marked by $t_R$ on the time axis t.

Figure 2:
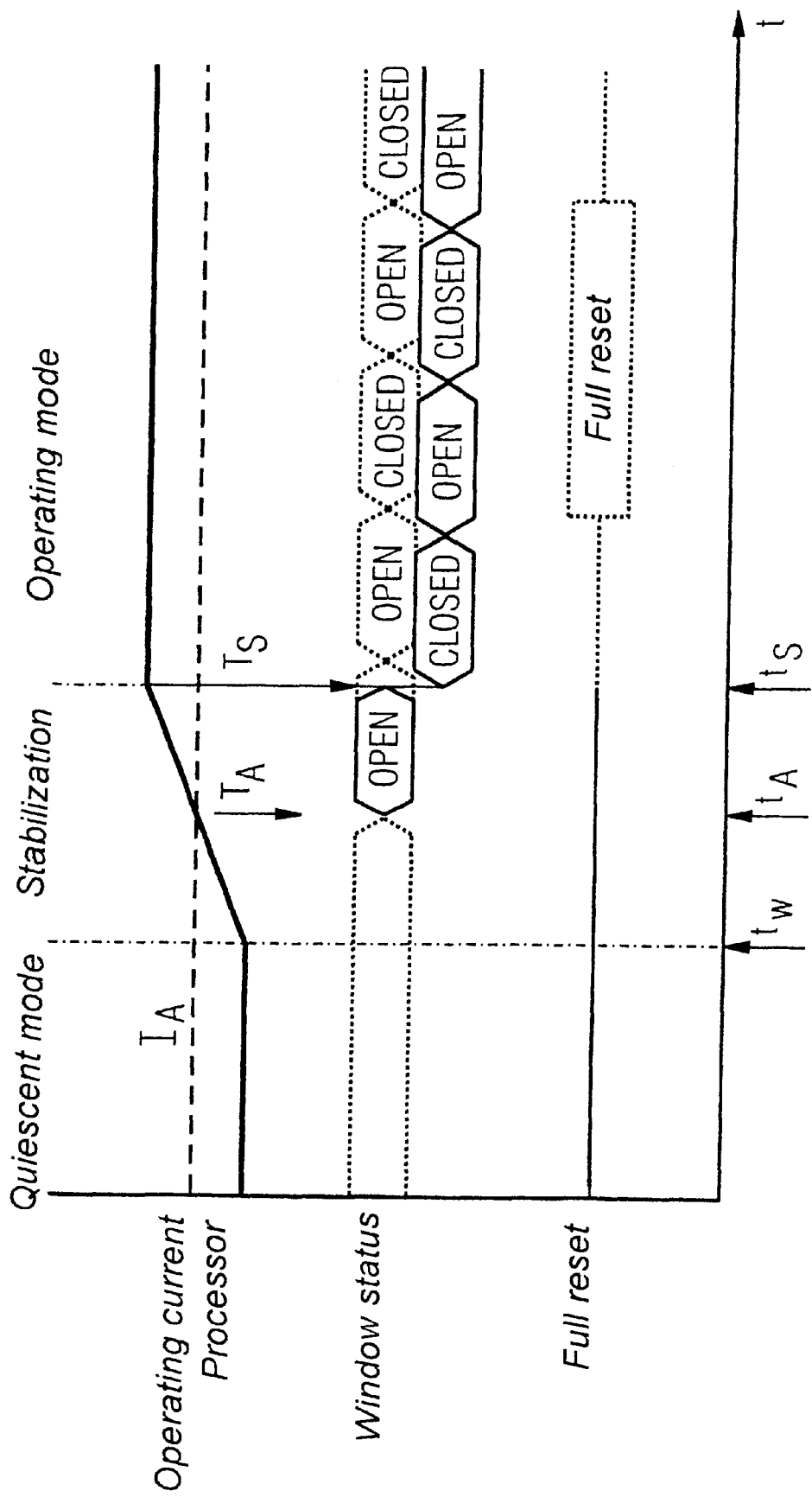
FIG. 2 is a similar view illustrating a microprocessor being run up from the quiescent mode to an operating mode.
Figure 3:
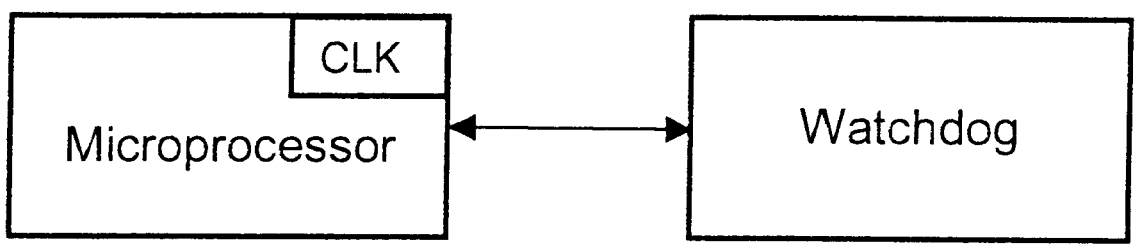
FIG. 3 is a diagram illustrating a microprocessor and a watchdog.

FIG. 2 now shows the behavior of the monitoring device when, having achieved operational availability, i.e. having reached the maximum operating current, the operable microprocessor passes on the trigger signal signaling this state to the monitoring device. This trigger signal is marked by $T_S$ in FIG. 2, and the instant at which the trigger signal is produced is marked by $t_S$.

Since the two OPEN windows together define a time period which is longer than the maximum stabilization time of the clock-signal generator associated with the microprocessor, the trigger signal $T_S$ always appears in the OPEN window range formed by the two OPEN windows. At that instant, the monitoring device starts its toggle operation between the CLOSED window status and the OPEN window status, starting with a CLOSED window, which produces synchronization.

For the purposes of better illustration, the starting toggle operation is plotted in a further line below the actual window status. The figure thus clearly shows that the (emergency) reset provided at the instant $t_R$ is triggered only if the microprocessor has not started to operate properly.

We claim:

1. A method of synchronizing a microprocessor watchdog with a microprocessor when the microprocessor is run up from a quiescent mode to an operating mode, which comprises:

producing a trigger signal with a microprocessor indicating an operational availability of the microprocessor, and transmitting the trigger signal to a microprocessor watchdog;

temporally toggling the microprocessor watchdog between a CLOSED window status, during which the trigger signal cannot be detected by the microprocessor watchdog, and an OPEN window status, during which the received trigger signal brings about a synchronization between the microprocessor and the microprocessor watchdog; and upon having been activated, providing an OPEN window range over a predetermined time period with the microprocessor watchdog, whereby the time period is predetermined to detect the trigger signal produced by the microprocessor operating under normal conditions.

2. The method according to claim 1, which comprises, at the end of the predetermined time period, toggling the microprocessor watchdog between a CLOSED window status and an OPEN window status, starting with a CLOSED window status.

3. The method according to claim 1, wherein the microprocessor includes a clock-signal generator having a maximum stabilization time, and the microprocessor watchdog providing a first OPEN window range with a time duration corresponding at least to the maximum stabilization time of the clock-signal generator.

4. The method according to claim 1, which comprises activating the microprocessor watchdog before the microprocessor has achieved full operational availability.

5. An electronic device for monitoring the operation of a microprocessor, comprising:

a trigger signal input toggling between a CLOSED window position and an OPEN window position, said trigger signal input receiving in the OPEN window position a trigger signal from a microprocessor bringing about a synchronization between the microprocessor and the electronic monitoring device; and the electronic monitoring device, upon being activated, first starting in the OPEN window position and maintaining the OPEN window position for a time duration sufficient to detect the trigger signal from the microprocessor operating under normal conditions, wherein the OPEN window position is followed by a window change sequence comprising CLOSED windows and OPEN windows, starting with a CLOSED window.

6. The monitoring device according to claim 5, wherein the microprocessor has a clock-signal generator with a maximum stabilization time, and the first OPEN window position has a time duration whose length corresponds at least to maximum stabilization time of the clock-signal generator of the microprocessor.

7. The monitoring device according to claim 6, wherein the first OPEN window position has a time duration whose length is slightly longer than the maximum stabilization time of the clock-signal generator of the microprocessor.

8. The monitoring device according to claim 5, wherein the first OPEN window position is formed of a plurality of individual OPEN windows.

9. The monitoring device according to claim 5, wherein the first OPEN window position is formed of two individual OPEN windows.

* * * * *